United States Patent [19]

Yamamuro

[11] Patent Number: 5,018,121
[45] Date of Patent: May 21, 1991

[54] OPTICAL RECORDING/REPRODUCING FOCUSING APPARATUS

[75] Inventor: Mikio Yamamuro, Kawasaki, Japan

[73] Assignee: Kabushiki Kaisha Toshiba, Kawasaki, Japan

[21] Appl. No.: 290,339

[22] Filed: Dec. 27, 1988

[30] Foreign Application Priority Data

Dec. 28, 1987 [JP] Japan .................. 62-334738

[51] Int. Cl.⁵ .............................. G11B 7/00
[52] U.S. Cl. ................................. 369/44.11
[58] Field of Search ............ 358/342; 250/201; 369/44.11, 44.41, 44.25, 32

[56] References Cited

U.S. PATENT DOCUMENTS 4,243,848  1/1981  Utsumi ................. 369/44.25
4,492,856  1/1985  Kimura ............... 369/44.41 X
4,701,897  10/1987 Nakagawa ............... 369/32

FOREIGN PATENT DOCUMENTS

2734163A1  7/1977  Fed. Rep. of Germany .
3218265A1  5/1982  Fed. Rep. of Germany .
3701144A1  1/1987  Fed. Rep. of Germany .

Primary Examiner—Robert L. Richardson
Attorney, Agent, or Firm—Finnegan, Henderson, Farabow, Garrett and Dunner

[57] ABSTRACT

An apparatus for focusing a light beam onto an object includes a directing element for directing the light beam onto the object, a first detector for detecting the light beam from the object so as to generate a focus signal representing a distance of the directing element with respect to the object. The apparatus further includes a generator for generating a reproduced signal representing the data from the focal signal generated by the first detector. An adjuster adjusts the location of the directing element with respect to the object in accordance with the envelope of the reproduced signal generated by the generator.

15 Claims, 5 Drawing Sheets

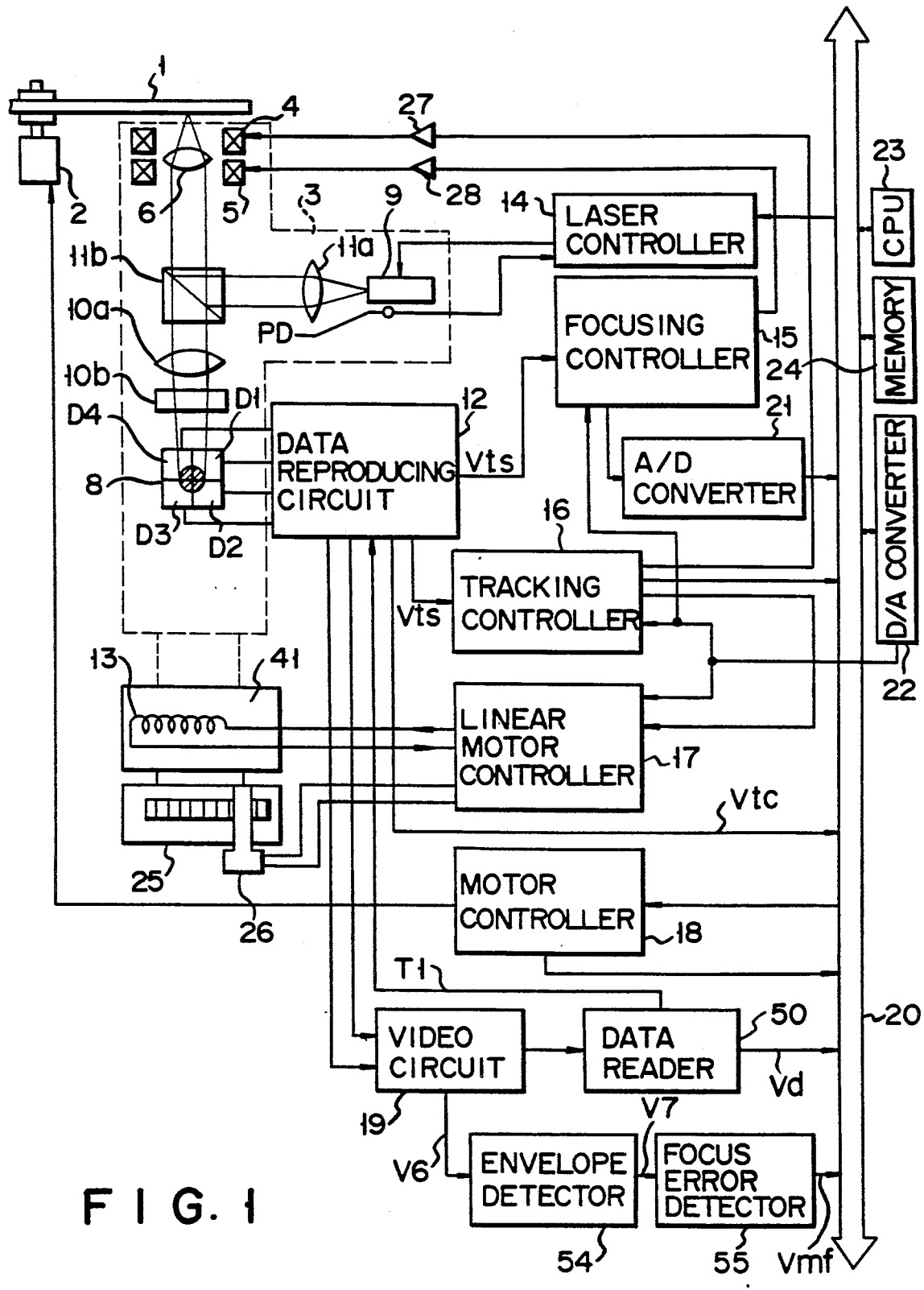
F I G. 1

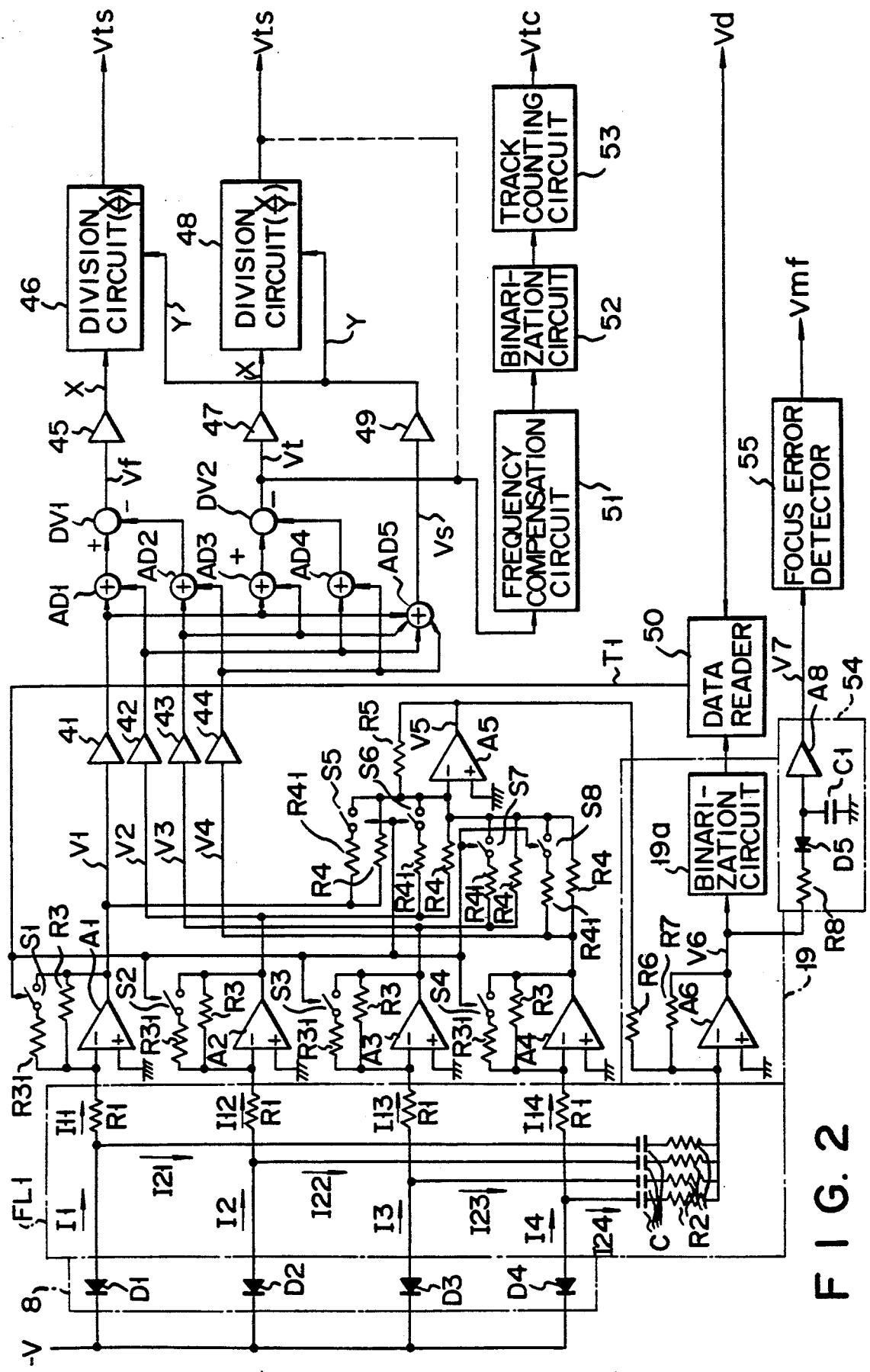
F I G. 2

F I G. 3
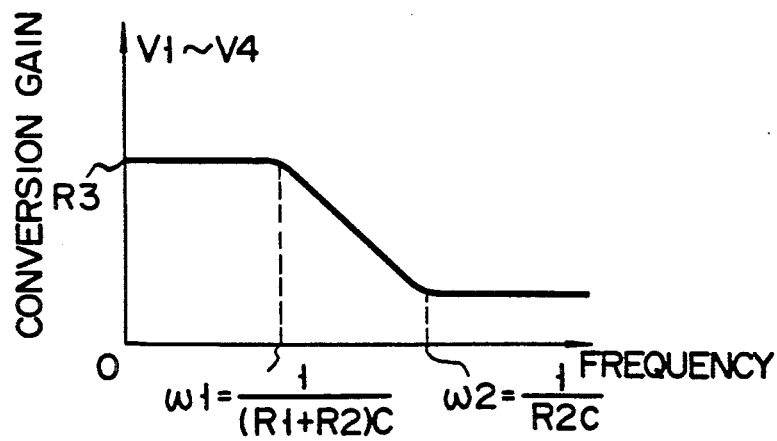
F I G. 4
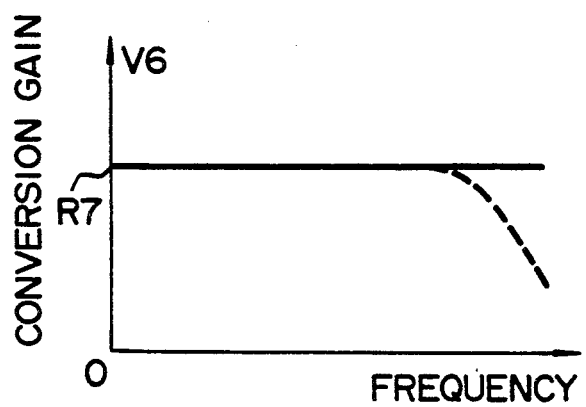
F I G. 5
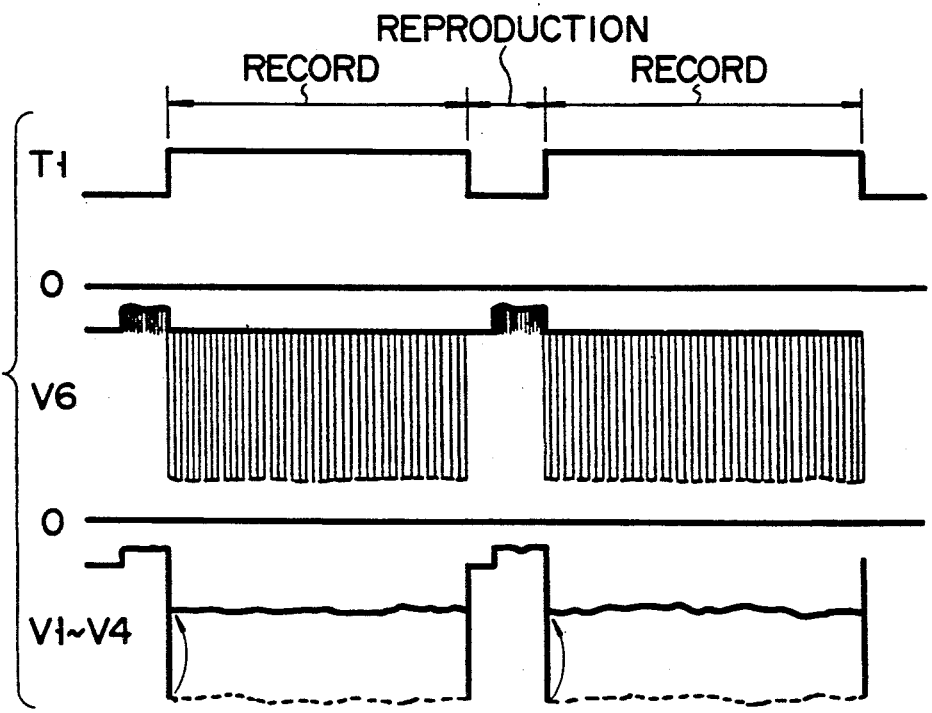

F I G. 6A
F I G. 6B
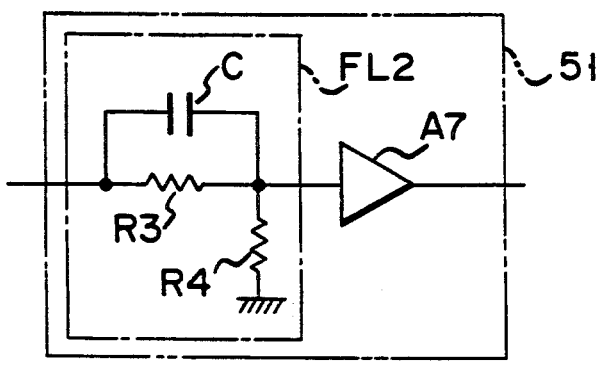
F I G. 7
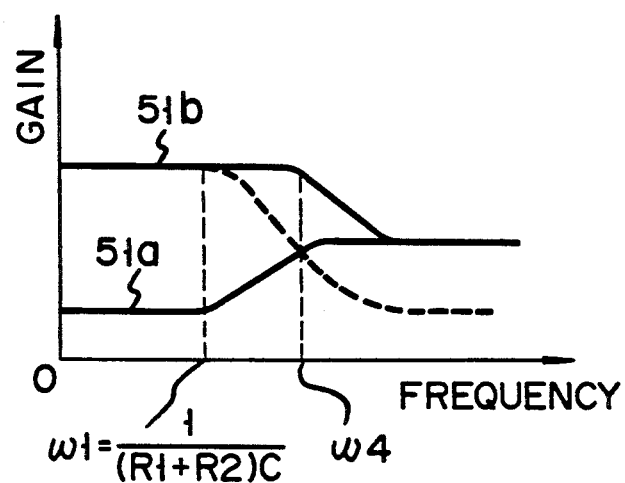
F I G. 8

OPTICAL RECORDING/REPRODUCING FOCUSING APPARATUS

BACKGROUND OF THE INVENTION

1. Field of the Invention

The present invention relates to an optical apparatus and, more particularly, to a data recording/reproducing apparatus for recording data on or reproducing data from an optical recording medium.

2. Description of the Related Art

As one type of data recording/reproducing apparatus, optical disk apparatus have been developed. A conventional optical disk apparatus records data in the form of pits along a spiral track of an optical disk by means of an optical head and reproduces the data from the pits recorded on the disk. The area between the pits is called a land portion. The optical head comprises a light source for directing a light beam to the optical disk, an objective lens and a plurality of photoelectric conversion elements for detecting reflected light from the optical disk. An output current for each of the conversion elements detected by a corresponding photoelectric element is converted to a voltage by a corresponding current-to-voltage converter. Output voltages of the current-to-voltage converters are subjected to arithmetic operations, such as addition and subtraction, to produce a focus signal, a tracking signal and a reproduced signal for recorded data. The focus signal is used for focus control which keeps the distance between the disk and the objective lens constant to correct a focus error resulting from vertical movement of the surface of the disk. The tracking signal is used for radial tracking which controls the light beam not to deviate from a track during recording or reproducing. The focus signal and tracking signal cover a frequency range of DC—20 KHz, while the reproduced signal for recorded data covers a wide range of frequencies of DC—several MHz.

U.S. Pat. No. 4,701,897 discloses such an optical disk apparatus.

The conventional optical disk apparatus described above has the following drawbacks.

First, irrespective of the focus control, a focus error might be caused because of an external shock or the like. Conventionally, to detect this type of focus error, a special sensor is used or an average value of output currents of the photoelectric elements is calculated. The average value of the output currents is lowered when the focus error occurs. When the special sensor is used, however, the number of parts used increases, complicating the construction of the disk device. During reproduction the average amount of the reflected light from pits of the optical disk also lowers as is the case with the focus error. Hence, the average value of the output currents of the photoelectric elements will make it difficult to discriminate between the recorded data and the focus error. As a result, the focus error cannot be detected accurately and thus the reproduction cannot be performed accurately.

To produce the focus control signal, the tracking signal and the reproduced signal, operational amplifiers are usually used as current-to-voltage converters. The use of a plurality of relatively wideband operational amplifiers would raise the total cost of the disk device.

A semiconductor laser is used as the light source of the optical head. The output level of the semiconductor laser during recording is set higher than that during reproducing. Thus, at a time of recording, a photodiode, which receives reflected light from the optical disk, will produce a larger output current. Where the output current is applied to a division circuit for normalization, therefore, the division circuit is required to have a greater dynamic range in order to perform an accurate arithmetic operation. As a result, the cost of parts will be raised.

For recording or reproducing, a desired track must be accessed by moving the light beam. To determine a distance traveled by the light beam, a track counting circuit is conventionally used to count the number of tracks which are crossed by the light beam. A narrow-band tracking signal is used for counting the tracks. When the light beam crosses a track at high speed, therefore, the amplitude of the tracking signal becomes small, failing to obtain the correct count. As a result, the access operation becomes inaccurate and thus the accurate recording or reproduction cannot be attained.

In view of the foregoing an optical apparatus is desired which is low in the cost of parts and can record or reproduce data accurately.

SUMMARY OF THE INVENTION

It is accordingly an object of the present invention to provide an optical apparatus which is low in the cost of parts used and can record or reproduce data accurately.

In accordance with the foregoing object, the first aspect of the present invention includes an apparatus for focusing a light beam onto an object to reproduce data recorded on the object, comprising means for directing the light beam onto the object, means for detecting the light beam from the object so as to generate a focus signal representing a distance of the directing means with respect to the object, means for generating a reproduced signal representing the data from the focus signal generated by the detecting means, the reproduced signal having an envelope, and means for adjusting the location of the directing means with respect to the object in accordance with the envelope of the reproduced signal generated by the generating means.

The second aspect of the present invention includes an apparatus for focusing a light beam onto an object, the object having a preformed track for guiding the light beam, comprising means for directing the light beam onto the object, means for detecting the light beam from the object so as to generate a tracking signal representing a location of the light beam with respect to the track of the object, the tracking signal having a varying amplitude, means for compensating a variation in the amplitude of the tracking signal generated by the detecting means, and means, responsive to the compensating means, for detecting the existence of the track of the object.

The third aspect of the present invention includes an apparatus for focusing a light beam onto an object to reproduce data recorded on the object, comprising means for directing the light beam onto the object, means for detecting the light beam from the object so as to generate an electrical signal having a high-frequency component and a low-frequency component, means for separating the high-frequency component and the low-frequency component of the electrical signal generated by the detecting means, means for amplifying the low-frequency component separated by the separating means so as to adjust a location of the directing means with respect to the object, the low-frequency amplifying means having a frequency band corresponding to the low-frequency component, and means for amplifying the high-frequency component separated by the separating means so as to reproduce the data from the object, the high-frequency amplifying means having a frequency band corresponding to the high-frequency component.

The fourth aspect of the present invention includes an apparatus for recording data on an object in a recording mode and for reproducing data from the object by using a light beam, the apparatus comprising means for directing the light beam onto the object, means for detecting the light beam from the object so as to generate an electrical signal representing the data, the electrical signal having an amplitude varying between a recording mode and a reproducing mode, means for amplifying the electrical signal generated by the detecting means so as to adjust a location of the directing means with respect to the object, and means for adjusting an amplification factor of the amplifying means so as to compensate the varying amplitude of the electrical signal, generated by the detecting means.

BRIEF DESCRIPTION OF THE DRAWINGS

FIG. 1 is a schematic block diagram of an optical apparatus embodying the present invention;

FIG. 2 is a detailed circuit diagram of the data reproducing circuit of FIG. 1;

FIGS. 3 and 4 show performance characteristics of operational amplifiers used in the circuit of FIG. 2;

FIG. 5 is a diagram explaining the operation of the operational amplifiers A1 through A4 of FIG. 2 during recording or reproduction;

FIGS. 6A and 6B show waveforms explaining the correction operation of a tracking signal;

FIG. 7 shows a practical arrangement of the frequency correcting circuit of FIG. 2;

FIG. 8 shows characteristics of the frequency correcting circuit of FIG. 7; and

DETAILED DESCRIPTION OF THE PREFERRED EMBODIMENT

Figure 9A:
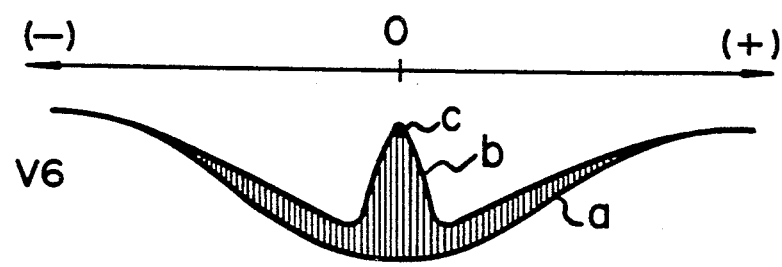
FIGS. 9A through 9C are diagrams explaining an operation of detecting a focus error.

Referring to FIG. 1, which shows an optical apparatus embodying the present invention, an optical disk 1 is rotated by a motor 2 at a constant speed. Motor 2 is controlled by a motor controller 18. Data is recorded on or reproduced from optical disk 1 by means of an optical head 3 which is coupled to a linear motor 41. Linear motor 41 comprises a driving coil 13 as its moving portion and a permanent magnet (not shown) as its stationary portion. Driving coil 13 is connected to a linear motor controller 17. When driving coil 13 is excited by linear motor controller 17, optical head 3 is driven to move in the direction of radius of optical disk 1. A linear-motor position detector 26 is connected to linear motor controller 17. Linear-motor position detector 26 produces a position signal indicative of a distance traveled by optical head 3 in response to an optical scale 25, which is connected to optical head 3.

Optical head 3 includes an objective lens 6, held by leaf springs not shown, and driving coils 4, 5. Objective lens 6 is moved in the direction of the optical axis of the lens to maintain focus by driving coil 5 and in the direction of radius of optical disk 1 (normal to the optical axis of the lens) by driving coil 4. Optical head 3 further includes a semiconductor laser 9, a photodiode PD, a collimator lens 11a, a half prism 11b, a condenser lens 10a, a cylindrical lens 10b and a quadrant detector 8.

Semiconductor laser 9 is driven by a laser controller 14 disposed outside optical head 3. The amount of light emitted by semiconductor laser 9 is detected by photodiode PD disposed near the laser 9. Laser controller 14 responds to an output of photodiode PD to keep the amount of light emitted by semiconductor laser 9 constant.

The light emitted by semiconductor laser 9 is directed to optical disk 1 via collimator lens 11a, half prism 11b, and objective lens 6. The light reflected from disk 1 is directed to quadrant detector 8 via objective lens 6, half prism 11b, condenser lens 10a and cylindrical lens 10b. Quadrant detector 8 is composed of photodiodes D1 to D4 whose output signals are applied to a data reproducing circuit 12. Data reproducing circuit 12 produces a focus signal Vfs, a tracking signal Vts and a track count signal Vtc. Focus signal Vfs and tracking signal Vts are applied to focus controller 15 and tracking controller 16, respectively, to produce a focus control signal and a tracking control signal. The focus control signal is applied via an amplifier 28 to driving coil 5 for driving objective lens 6 to maintain focus, while the tracking control signal is applied via an amplifier 27 to driving coil 4 for driving objective lens 6 in the direction of radius of the optical disk. The tracking control signal is also used for moving optical disk 3 and hence applied to linear motor controller 17.

The output signals of photodiodes D1-D4 are added in data reproducing circuit 12 to produce a sum signal which in turn is applied to a video circuit 19. In video circuit 19, the sum signal is reproduced as digital data. The reproduced data is supplied to a data reader 50. Data reader 50 demodulates recorded data Vd and produces a timing signal T1 which controls the current-to-voltage conversion gain of data reproducing circuit 12 when data is recorded. The reproduced data is also applied to an envelope detector 54 which detects the envelope of the sum signal, which corresponds to reflected light from land portions on optical disk 1. Detected output of detector 54 is applied to a focus error detector 55 which detects whether the surface of the disk is out of focus or not. The out-of-focus may be caused by faults of the disk, dust particles on the disk and so on. The result of detection is applied to CPU 23.

Data reproducing circuit 12, video circuit 19, data reader 50, envelope detector 54 and focus error detector 55 will be detailed later.

Laser controller 14, focus controller 15, tracking controller 16, linear motor controller 17 and motor controller 18 are coupled to CPU 23 by a bus line 20. CPU 23 is programmed to perform predetermined operations in accordance with programs stored in a memory 24.

Reference numerals 21 and 22 denote an analog-to-digital (A/D) converter and a digital-to-analog (D/A) converter, respectively, which are used for transferring data among focus controller 15, tracking controller 17, linear motor controller 17 and CPU 23.

FIG. 2 shows data reproducing circuit 12 in detail. Photodiodes D1 through D4 constituting quadrant detector 8 have cathodes connected together to a power supply −V and anodes connected via resistors R1 of a filter FL1 to inverting inputs of operational amplifiers A1 through A4, respectively. Operational amplifiers A1 through A4 have noninverting inputs connected to ground and outputs connected via resistors R3 to their respective inverting inputs. A series circuit of a switch S1 and a resistor R31 is connected between the output and the inverting input of operational amplifier A1. A series circuit of a switch S2 and a resistor R31 is connected between the output and the inverting input of operational amplifier A2. Further, a series circuit of a switch S3 and a resistor R31 is connected between the output and the inverting input of operational amplifier A3. Likewise a series circuit of a switch S4 and a resistor R31 is connected between the output and the inverting input of operational amplifier A4.

The output of operational amplifier A1 is connected to the inverting input of an operational amplifier A5 via a resistor R4 across which a series circuit of a resistor R41 and a switch S5 is connected. The output of operational amplifier A2 is connected to the inverting input of operational amplifier A5 via a resistor R4 across which a series circuit of a resistor R41 and a switch S6 is connected. Furthermore, the output of operational amplifier A3 is connected to the inverting input of operational amplifier A5 via a resistor R4 across which a series circuit of a resistor R41 and a switch S7 is connected. Likewise the output of operational amplifier A4 is connected to the inverting input of operational amplifier A5 via a resistor R4 across which a series circuit of a resistor R41 and a switch S8 is connected. Operational amplifier A5 has its noninverting input connected to ground and its output connected to its inverting input via a resistor R5.

Switches S1 through S8 are so switched by timing signal T1 issued from data reader 50 described later that they are turned on when data is recorded on optical disk and turned off when data is reproduced from optical disk 1.

On the other hand, the anodes of photodiodes D1 through D4 are connected to the inverting input of an operational amplifier A6 serving as video circuit 19 via series circuits each of a resistor R2 and a capacitor C constituting filter circuit FL1. Operational amplifier A6 has its noninverting input connected to ground and its inverting input connected to the output of operational amplifier A5 via a resistor R6 and to its output via a resistor R7. The output of operational amplifier A6 is connected to the input of a binarization circuit 19a which produces binary recorded data.

The values of resistors R1, R2 and capacitor C of filter FL1 are set so that the band-dividing frequency of the filter may be above the frequency range of the focus control signal and tracking control signal and below the range of frequencies handled by operational amplifiers A1 through A5.

The characteristics that operational amplifiers A1 through A5 should have will be described hereinafter.

In the above arrangement, light reflected from optical disk 1 impinges on quadrant detector 8 so that photodiodes D1–D4 produce currents of I1–I4, respectively.

Here assuming that the currents flowing through resistors R1 are I11–I14, and the currents flowing through series circuits of capacitor C and resistor R2 are I21–I24, I1n (I11–I14) and I2n (I21–I24) are given by $$I1n = (1+j\omega CR2)/\{1+j\omega C(R1+R2)\} \times In$$

$$I2n = j\omega CR1/\{1+j\omega C(R1+R2)\} \times In$$

where n = 1~4.

Accordingly, the output voltages V1–V4 of operational amplifiers A1–A4 will be represented by $$Vn = -(1+j\omega CR2)/\{1+j\omega C(R1+R2)\}InR3$$

Operational amplifiers A1–A4 thus operate as current-to-voltage converters having such characteristics as shown in FIG. 3.

Assuming that R3 = R4, the output voltage V5 of operational amplifier A5 will be given by $$\begin{aligned} V5 &= -R5(V1 + V2 + V3 + V4)/R4 \\ &= (1 + \omega CR2)/\{1 + j\omega C(R1 + R2)\} \times \\ &\quad (I1 + I2 + I3 + I4)R5 \end{aligned}$$

Assuming that R5 = R6, the output voltage V6 of operational amplifier A6 will be given by $$\begin{aligned} V6 &= -R7\{(I21 + I22 + I23 + I24) + V5/R6\} \\ &= -R7\,[j\omega CR1/\{1 + j\omega C(R1 + R2)\} \times \\ &\quad (I1 + I2 + I3 + I4) + \\ &\quad (1 + j\omega CR2)/\{1 + j\omega C(R1 + R2)\} \times (I1 + I2)] \\ &= -R7(I1 + I2 + I3 + I4) \end{aligned}$$

The output voltage V6 of operational amplifier A6 involves a current-to-voltage conversion value of the sum of the input currents over the entire frequency range. Operational amplifier A6 therefore needs such a characteristic as shown in FIG. 4. In the circuit arrangement of FIG. 2, R2 may be 0, in which case $\omega 2 = \infty$.

Since operational amplifiers A1–A5 are simply required to perform the current-to-voltage conversion in accordance with the characteristic shown in FIG. 3, the proper selection of R1, R2, C would enable the use of narrowband operational amplifiers. A wideband operational amplifier having such a characteristic as shown in FIG. 4 may be used for operational amplifier A6 alone. This will make possible to construct the whole circuit at a low cost.

As described above, where the output currents of photodiodes D1–D4 are processed by operational amplifiers A1–A4, A6, output voltages V1–V4 of operational amplifiers A1–A4 represent an average value of the amount of light reflected from the optical disk, and output voltage V6 of operational amplifier A6 represents a data signal recorded on the optical disk. Hence if $\omega 1$ in FIG. 3 is set to 10–20 KHz, arithmetic operations such as addition and subtraction of the output voltages V1–V4 may produce a focus control signal or tracking control signal.

That is to say, output signals V1 and V2 of operational amplifiers A1 and A2 are applied to an adder AD1 via amplifiers 41 and 42, respectively, while output signals V3 and V4 of operational amplifiers A3 and A4 are applied to an adder AD2 via amplifiers 43 and 44, respectively. Output signals of adders AD1 and AD2 are applied to a subtracter DV1 to produce the focus signal Vf which in turn is applied to a division circuit 46 via an amplifier 45.

The output signals of amplifiers 41 and 43 are applied to an adder AD3, while the output signals of amplifiers 42 and 44 are applied to an adder AD4. Output signals of adders AD3 and AD4 are applied to a subtracter DV2 to produce the tracking signal Vt which in turn is applied to a division circuit 48 via an amplifier 47. Furthermore, the output signals of amplifiers 41-44 are applied to an adder AD5 where they are added together to produce a sum signal Vs. The sum signal Vs is applied to division circuits 46 and 48 via an amplifier 49. In division circuits 46 and 48 the focus error signal Vf and the tracking signal Vt are divided by the sum signal Vs to produce a normalized focus error signal Vfs and a normalized tracking signal Vts which are applied to focus controller 15 and tracking controller 16, respectively.

As described above, the output voltage V6 of operational amplifier A6 is a reproduced signal for data recorded on the optical disk. This signal is encoded into a two-value signal by binarization circuit 19a and thus handled as a digital signal. The digital signal output from binarization circuit 19a is applied to data reader 50 incorporating a demodulator, a timing circuit, etc., where recorded data is recovered. The recovered recorded data Vd, which includes address data, is applied to CPU 23. CPU 23 produces a control signal to direct the optical head 3 to a destination address in response to the address data applied thereto.

When data is recorded on optical disk 1, data reader 50 issues a timing signal T1 which represents that the optical disk is now in a record mode.

The function of the timing signal T1 will be described hereinafter.

During recording the output of semiconductor laser 9 is made stronger than during reproduction. Output currents I1-I4 of photodiodes D1-D4 are thus large as compared with those during reproduction. Output voltages V1-V4 of operational amplifiers A1-A4 and the sum voltage Vs thereof become large accordingly. Where the level of signals varies greatly, division circuits 46, 48 supplied with these signals require a great dynamic range. A division circuit with a great dynamic range, however, is expensive.

For this reason, in this embodiment switches S1-S4 are closed by the timing signal T1 during a record mode as shown in FIG. 5 so as to lower the current-to-voltage conversion gain of each of operational amplifiers A1-A4. As a result, output voltages V1-V4 are rendered lower than the level indicated by a dotted line in FIG. 5 and thus the output voltages do not exhibit a great difference in level between a recording operation and a reproduction operation.

The scheme of controlling the current-to-voltage conversion gain of operational amplifiers A1-A4 as described above has the following advantages over the scheme of switching the gain of each of amplifiers 41-44 supplied with output voltages V1-V4 of operational amplifiers A1-A4 in accordance with a record mode or a reproduction mode.

That is, the latter case has a problem that output voltages V1-V4 might distort where there is a limitation on the power supply voltage of operational amplifiers A1-A4. Namely, where the gains of amplifiers 41-44 are switched, output voltages V1-V4 must be amplified further to provide necessary gain control. In this case offset voltages of operational amplifiers A1-A4 would also be amplified, making the control unstable and causing distortion. However, such a problem can be avoided by performing the gain control by operational amplifiers A1-A4 as in this embodiment.

Moreover, switches S1-S4 associated with operational amplifiers A1-A4 and switches S5-S8 are turned on by timing signal T1 with the result that the gains of operational amplifiers A1-A4 are lowered, but the gain of operational amplifier A6 is raised correspondingly. For this reason, irrespective of recording and reproducing, output voltage V6 of amplifier A6 corresponds to an output obtained by converting the sum I1+I2+I3+I4 of the output currents of photodiodes D1-D4 at a constant conversion gain. Hence, a transient phenomenon will not occur when switching between recording and reproducing, allowing recorded data to be reproduced stably.

An improved method of counting the number of tracks a light beam crosses will be described hereinafter.

As described above, after the reproduced signal is converted to a digital signal by video circuit 19, address data indicative of the current position of the light beam is recovered in data reader 50. To move the light beam from the current address to another address over optical disk 1 for recording or reproducing data, the position control of the light beam must be performed by CPU 23. In this case it is necessary to determine a distance traveled by the light beam. In other words, it is necessary to count the number of tracks that the light beam has crossed. Since the tracking signal Vt results from reflected light of the light beam which crosses the tracks of optical disk 1, if the binary signal of the tracking signal Vt is counted, then the number of tracks crossed by the light beam can be determined.

The tracking signal Vt is, however, a narrowband signal because it is formed of output voltages V1-V4 of operational amplifiers A1-A4. For this reason, when the light beam crosses tracks at a high speed, the amplitude of the tracking signal becomes small as shown in FIG. 6A, and thus fails to count the tracks.

According to this embodiment, the tracking signal Vt output from subtracter DV2 shown in FIG. 2 is applied to a frequency compensation circuit 51. As shown in FIG. 7, frequency compensation circuit 51 comprises a filter circuit FL2 comprised of resistors R3, R4 and a capacitor C and an amplifier A7 connected to receive an output signal of filter FL2. Frequency compensation circuit 51 has, as shown by 51a in FIG. 8, such a frequency characteristic that the gain begins to rise at the band division frequency $\omega 1$ of band division filter FL1 and stops rising at a frequency $\omega 4$ lower than frequencies of the reproduced signal for recorded data. Hence the frequency characteristic of the tracking signal passing through frequency compensation circuit 51 improves as shown by 51b in FIG. 8. In this way, owing to frequency compensation circuit 51 it is possible to recover a signal obtained when the light beam crosses tracks at a high speed as shown in FIG. 6b. By converting an output signal of frequency compensation circuit 51 to a binary signal (two-level signal) in binarization circuit 52 and counting the binary signal in track counting circuit 53, it is possible to surely count the number of tracks that the light beam crosses.

Output signals I11-I14 of filter FL1 have reduced high-frequency components due to resistors R1, R2 and capacitor C. Even if the frequency characteristics of operational amplifiers A1-A4 is not so good, therefore, the small high-frequency components are little distorted in the operational amplifiers. The same is true of amplifiers 41-44 and succeeding circuits, and hence frequency compensation circuit 51 can easily recover a signal obtained when the light beam crosses a track.

In the above arrangement, output signal Vt of subtracter DV2 is applied to frequency compensation circuit 51. Alternatively, as shown by a dotted line in FIG.

2, output signal Vts of division circuit 48 may be applied to frequency compensation circuit 51. In this case, since the tracking signal to be converted to a binary signal is normalized by the sum signal Vs, the amplitude of the tracking signal is little varied by the presence or absence of data and differing reflectance, enabling the tracking signal to be converted to a binary signal more stably.

Next, the detection of a focus error will be described.

FIG. 9A shows a relationship between the distance between optical disk 1 and objective lens 6 and output signal V6 of operational amplifier A6. O represents the position at which the disk is in focus. Symbol (+) represents the direction in which objective lens 6 moves far from optical disk 1, while symbol (−) represents the direction in which objective lens 6 moves close to optical disk 1. Letter a represents an electric signal corresponding to reflected light from land portions where no pits are formed, while letter b represents an electric signal corresponding to reflected light from the pits of optical disk 1. As can clearly be seen from FIG. 9A, the level of output V6 of operational amplifier A6 reduces as the extent of out-of-focus state of the optical disk becomes large.

In the prior art, when a focus error occurs due to an external shock or fauts of optical disk 1 during recording or reproduction, the focus error is detected by utilizing the fact that an average value of electric signals from photodiodes D1–D4 reduces. However, even when photodiodes D1–D4 receive reflected light from the pits of optical disk 1, the output currents of the diodes reduce to the same extent, failing to detect the out-of-focus state accurately. On the other hand, a focus error could be detected by utilizing the fact that the level of output voltage signal V6 of operational amplifier V6 reduces when the focus error occurs. As shown by c in FIG. 9A, however, the level of output voltage signal V6 corresponding to reflected light from a pit reduces to the same extent as the output reduces when a focus error occurs. It is thus difficult to discriminate between the in-focus state and the out-of-focus state.

Figure 9B:
Figure 9C:
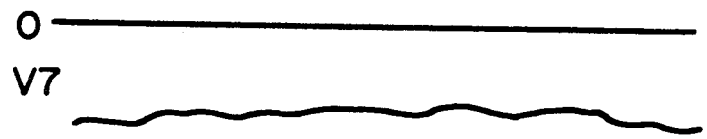

To detect the focus error, it is thus required to detect the level (envelope) of output voltage signal V6 of operational amplifier A6 corresponding to reflected light from land portions of the optical disk. FIG. 9B shows a waveform of output voltage V6 of operational amplifier A6 in the case where a focus error occurs. When output voltage V6 of operational amplifier A6 is applied to envelope detector 54 comprised of a resistor R8, a diode D5, a capacitor C1 and an amplifier A8, a voltage waveform V7 as shown in FIG. 9C is obtained. As is evident from comparison of the voltage waveform V7 with a voltage level (LPF in FIG. 9B) obtained by applying output voltage signal V6 of operational amplifier A6 to a lowpass filter, the voltage waveform V7 can be discriminated from the level of V6 in the out-of-focus state as shown in FIG. 9A. Hence, by comparison of V7 with a reference voltage in focus error detector 55 comprised of a voltage comparator, for example, it becomes possible to detect a focus error accurately.

Where an optical disk of a type in which the amount of reflected light from land portions reduces is used, the envelope of output V6 of operational amplifier A6 corresponding to reflected light from the pits may be detected.

According to the embodiment described above, the output currents of photodiodes D1–D4 are divided into comprised of resistors R1, R2 and capacitor C. The low-frequency signal component is subjected to the current-to-voltage conversion by operational amplifiers A1–A4, while the high-frequency signal component is subjected to the current-to-voltage conversion by operational amplifier A6 having a wideband characteristic. Since there is thus no need for wideband operational amplifiers which correspond in number to the photodiodes, the number of wideband operational amplifiers can be reduced and hence the manufacturing cost of the circuit can be reduced.

Further, the current-to-voltage conversion gain of each of operational amplifiers A1–A4 is lowered at a time of recording data. It is possible, therefore, to suppress a great variation in the signal level in either of recording and reproducing modes for reliable focus control and tracking control. Moreover, the gain of operational amplifier A5 supplied with output signals V1–V4 of operational amplifiers A1–A4 is raised at a time of recording data. It is possible, therefore, to keep the level of data reproduced signal V6 output from operational amplifier A6 constant in either of recording and reproducing modes.

Furthermore, to count the number of tracks crossed by the light beam, the tracking signal is subjected to frequency compensation by frequency compensation circuit 51 in which the rise of its gain stops at a frequency lower than frequencies of the data reproduced signal. Thereafter the output signal of frequency compensation circuit 51 is digitized by binarization circuit 52 and thus produced digital signals are counted by track counting circuit 53. Consequently, even when the light beam crosses the tracks at a high speed, the number of tracks can reliably be counted.

In addition, to detect a focus error, data reproduced signal V6 output from operational amplifier A6 is applied to envelope detector 54. Afterward, envelope detector 54 detects an envelope, of data reproduced signal V6, which corresponds to reflected light from land portions of the optical disk. A focus error can thus be detected accurately.

In the above description, the present invention is described with reference to the embodiment where a quadrant detector is used. The present invention is not limited to the use of the quadrant detector. If the number of photodiodes used is more than or equal to two, any arrangement of the detector may be used.

Although the preferred embodiment of the present invention has been disclosed and described, it is apparent that other embodiments and modifications are possible.

What is claimed is:

1. An apparatus for focusing a light beam onto an object to reproduce data recorded on the object, comprising:
    means for directing the light beam onto the object;
    first detecting means for detecting the light beam from the object so as to generate an electrical signal having a high-frequency component and a low-frequency component;
    means for separating the high-frequency component and the low-frequency component of the signal generated by the first detecting means;
    first amplifying means having a frequency band corresponding to the high-frequency component for second amplifying means having a frequency band corresponding to the low-frequency component for amplifying the low-frequency component separated by the separating means;

first generating means for generating a reproduced signal, with respect to the data recorded on the object, in accordance with the high-frequency component amplified by the first amplifying means, the reproduced signal having an envelope;

second detecting means for detecting a forced error by detecting the envelope including the reproduced signal supplied from the first generating means; and second generating means for generating a focus control signal to adjust a location of the directing means with respect to the object, according to the low-frequency component amplified by the second amplifying means.

2. An apparatus according to claim 1, wherein the first detecting means comprises a plurality of photodiodes for generating a plurality of electrical signals, and the generating means comprises means for adding the electrical signals.

3. An apparatus according to claim 2, wherein the adding means comprises an operational amplifier.

4. An apparatus according to claim 1, wherein the first detecting means comprises a plurality of photodiodes for generating a plurality of electrical signals, and the generating means comprises means for current-to-voltage converting each of the electrical signals.

5. An apparatus for focusing a light beam onto an object, the object having a preformed track for recording data, comprising:

means for directing the light beam onto the object;

first detecting means for detecting the light beam from the object so as to generate an electrical signal having a high-frequency component and a low-frequency component;

means for separating the high-frequency component and the low-frequency component of the signal generated by the first detecting means;

amplifying means having a frequency band corresponding to the low-frequency component for amplifying the low-frequency component separated by the separating means;

means for generating a signal representing a location of the light beam with respect to the track of the object, in accordance with the low-frequency component amplified by the amplifying means, the signal having a varying amplitude;

means for compensating a variation in the amplitude of the signal generated by the generating means; and second detecting means, responsive to a signal compensated by the compensating means, for detecting the existence of the track of the object.

6. An apparatus according to claim 5, wherein the compensating means comprises a frequency compensating circuit for frequency-compensating the signal.

7. An apparatus according to claim 6, wherein the frequency compensating circuit comprises a filter circuit for determining a frequency characteristic of the signal and an amplifier for amplifying the signal.

8. An apparatus according to claim 7, wherein the filter circuit comprises capacitors and resistors for determining the frequency characteristic of the signal.

9. An apparatus according to claim 5, wherein the second detecting means comprises a counting circuit for counting the signal compensated by the compensating means.

10. An apparatus according to claim 5, wherein the second detecting means comprises means for digitizing the signal compensated by the compensating means and means for counting the signal digitized by the digitizing means.

11. An apparatus for focusing a light beam onto an object to reproduce data recorded on the object, comprising:

means for directing the light beam onto the object;

means for detecting the light beam from the object so as to generate an electrical signal having a high-frequency component and a low-frequency component;

means for separating the high-frequency component and the low-frequency component of the electrical signal generated by the detecting means;

means for amplifying the low-frequency component separated by the separating means so as to adjust a location of the directing means with respect to the object, the low-frequency amplifying means having a frequency band corresponding to the low-frequency component; and means for amplifying the high-frequency component separated by the separating means so as to reproduce the data from the object the high-frequency amplifying means having a frequency band corresponding to the high-frequency component.

12. An apparatus according to claim 11, wherein the separating means comprises a band-dividing filter for dividing the electrical signal into the high-frequency component and the low-frequency component.

13. An apparatus according to claim 12, wherein the band-dividing filter comprises capacitors and resistors for determining a band-dividing frequency.

14. An apparatus according to claim 11, wherein the high-frequency amplifying means comprises means for current-to-voltage converting the electrical signal.

15. An apparatus according to claim 11, wherein the low-frequency amplifying means comprises means for current-to-voltage converting the electrical signal.

* * * * *

UNITED STATES PATENT AND TRADEMARK OFFICE
CERTIFICATE OF CORRECTION

PATENT NO. : 5,018,121

DATED : May 21, 1991

INVENTOR(S) : Mikio Yamamuro

It is certified that error appears in the above-identified patent and that said Letters Patent is hereby corrected as shown below:

On the title page:

In the Abstract, line 8, change "focal" to --focus--.

Signed and Sealed this

Sixteenth Day of March, 1993

*Attest:*

STEPHEN G. KUNIN

*Attesting Officer*     Acting Commissioner of Patents and Trademarks